Patented Nov. 27, 1945

2,389,723

UNITED STATES PATENT OFFICE 2,389,723

GUANIDINE CONDENSATION PRODUCTS AND DERIVATIVES THEREOF

Walter P. Ericks, Stamford, Conn., and Milton C. Whitaker, New York, N. Y., assignors to American Cyanamid Company, New York, N. Y., a corporation of Maine No Drawing. Original application December 13, 1940, Serial No. 369,950. Divided and this application September 23, 1942, Serial No. 459,436

1 Claim. (Cl. 260—9)

This invention relates to compounds useful as textile assistants and adhesives and to methods of preparing the same.

More particularly, it embraces the preparation of condensation products by reacting amidines such as guanidine with monosaccharides and polysaccharides (including disaccharides) such as dextrose, sucrose, starch, etc. These preparations may then be rendered insoluble by further reaction with an aldehyde, such as formaldehyde.

It is an object of this invention to prepare such resinous condensation products inexpensively and by simple processes. Another object of this invention is to prepare these products in a water soluble state. Other and further objects of this invention will become apparent from the following description.

A number of substances have heretofore been suggested and used as textile assistants, sizes and the like, but none has been found entirely satisfactory. Thus, some are oil-like, and cause rotting of the fibers; others are crystalline and flake off in use; while still others do not bind the fibers to a satisfactory degree.

The compounds of this invention possess none of the disadvantages found in preparations heretofore used. On the contrary they have highly satisfactory binding properties, do not flake off and can be readily washed out, if necessary. Due to tautomerism and their tendency to polymerization, the compounds herein prepared may coexist as any one of several monomers or polymers. Consequently, the assignment of a definite formula for even the simplest condensation product among those herein described is problematical.

Briefly, the objects of this invention are attained by producing the compounds above described by reacting a carbohydrate with an amidine such as guanidine. More specifically in a preferred form of the invention, a carbohydrate is reacted at a temperature varying from 80° to 180° C. with guanidine and, if necessary, in the presence of a solvent such as water and a catalyst such as hydrochloric acid until condensation is practically completed.

The following examples more fully illustrate the details of the process involved:

Example I 18 g. of guanidine carbonate was slurried with 200 cc. of water and 18.7 cc. of concentrated hydrochloric acid was added slowly and with stirring. 32.4 g. of tapioca flour was then added, the mixture stirred, refluxed for an hour, neutralized with sodium hydroxide solution, filtered and the filtrate evaporated practically to dryness by heating at 95° C. for several hours to yield 61.4 g. of a transparent, pale yellow, viscous resin which was readily soluble in water.

Reacting a small quantity of this resin with formaldehyde to which a drop of phosphoric acid had been added yielded a water insoluble resin.

Example II 15.3 g. of the starch-guanidine condensation product of Example I was melted at 80° C. with 16.35 g. of 3-octadecoxypropylamine, and 6 g. of glacial acetic acid was added in small portions while stirring. Heating this mixture at 90° C. on a steam bath while stirring for 15 minutes yielded a tan-colored wax which was readily dispersible in water. This aqueous dispersion foamed on shaking and possessed softening properties.

Although in the examples given emphasis has been placed on the starch compound, glucose, sucrose, the tetroses, pentoses, aldo-hexoses and other saccharoses can be used instead. For example, erythrose, arabinose, xylose, and levulose, as well as such reducing sugars as lactose and maltose may be utilized and reacted with various amidine compounds and the acyl, alkyl, aryl, and aralkyl derivatives thereof.

These compounds even when insoluble in cold water find considerable use as temporary sizes for rayon skeins, threads and the like since, due to their low melting points, they are easily fused and washed out by hot water containing a detergent or saponifying compound.

Still other compounds especially those having resinous and gum-like properties, are well suited for the preparation of adhesives.

Furthermore, the condensation products of these carbohydrates and amidines with long chain aliphatic amines or aliphatic acids possess softening properties and in addition find use as wetting, emulsifying, de-emulsifying, and antiseptic agents, as insecticides, paper and leather softeners, flotation agents, and the like. Since their reaction products with the various amines possess a low alkalinity and have such good solubility and wetting properties they can be successfully used in photographic developers.

The products of this invention are resinous or wax-like condensation masses having use as adhesives for envelopes, fillers and adhesives for paper, sizes for cotton, silk, rayon and paper. Some of them are useful waterproofing and crease-proofing agents, and intermediates for the synthesis of surface-active materials, softening agents and other textile assistants.

This application is a division of our co-pending application, Serial No. 369,950, filed December 13, 1940, for "Cyanamide condensation products and derivatives thereof."

It is to be understood that the examples herein given are merely illustrative embodiments of this invention and since many modifications and various proportions of reacting ingredients may be used, the examples described should not be deemed to limit the scope of the invention except as defined in the appended claim.

We claim:

A condensation product of a guanidine and starch which has been prepared by reacting guanidine carbonate and tapioca flour in the presence of concentrated hydrochloric acid, where the reactants are present in a ratio of 18 grams of guanidine carbonate, 32.4 grams of tapioca flour, and 18.7 cc. of concentrated hydrochloric acid, under refluxing conditions for one hour, followed by neutralization with caustic soda and recovery of the condensation product.

WALTER P. ERICKS
MILTON C. WHITAKER.